United States Patent [19]

Skarpelos et al.

[11] Patent Number: 5,028,384
[45] Date of Patent: Jul. 2, 1991

[54] METHOD FOR ENHANCING PERSONNEL SAFETY IN OPERATING A NUCLEAR REACTOR PLANT, AND MEANS THEREFOR

[75] Inventors: John M. Skarpelos; Lin, Chien-Chang, both of Fremont, Calif.

[73] Assignee: General Electric Company, San Jose, Calif.

[21] Appl. No.: 391,003

[22] Filed: Aug. 9, 1989

[51] Int. Cl.⁵ .............................................. G21C 9/00
[52] U.S. Cl. .................................... 376/306; 376/308
[58] Field of Search ................ 376/305, 306, 308, 310

[56] References Cited

U.S. PATENT DOCUMENTS 4,297,150 10/1981 Foster et al. ......................... 376/305
4,842,812 6/1989 Panson et al. ........................ 376/306

Primary Examiner—Daniel D. Wasil
Attorney, Agent, or Firm—R. R. Schroeder

[57] ABSTRACT

A measure providing improved personnel safety in the operation of a steam producing, water cooled, boiling water nuclear fission reactor for generating electrical power is disclosed. The measure comprises utilizing catalytic oxidation to inhibit the escape of certain radioactive material from the reactor and its passage through the steam circuit.

10 Claims, 1 Drawing Sheet

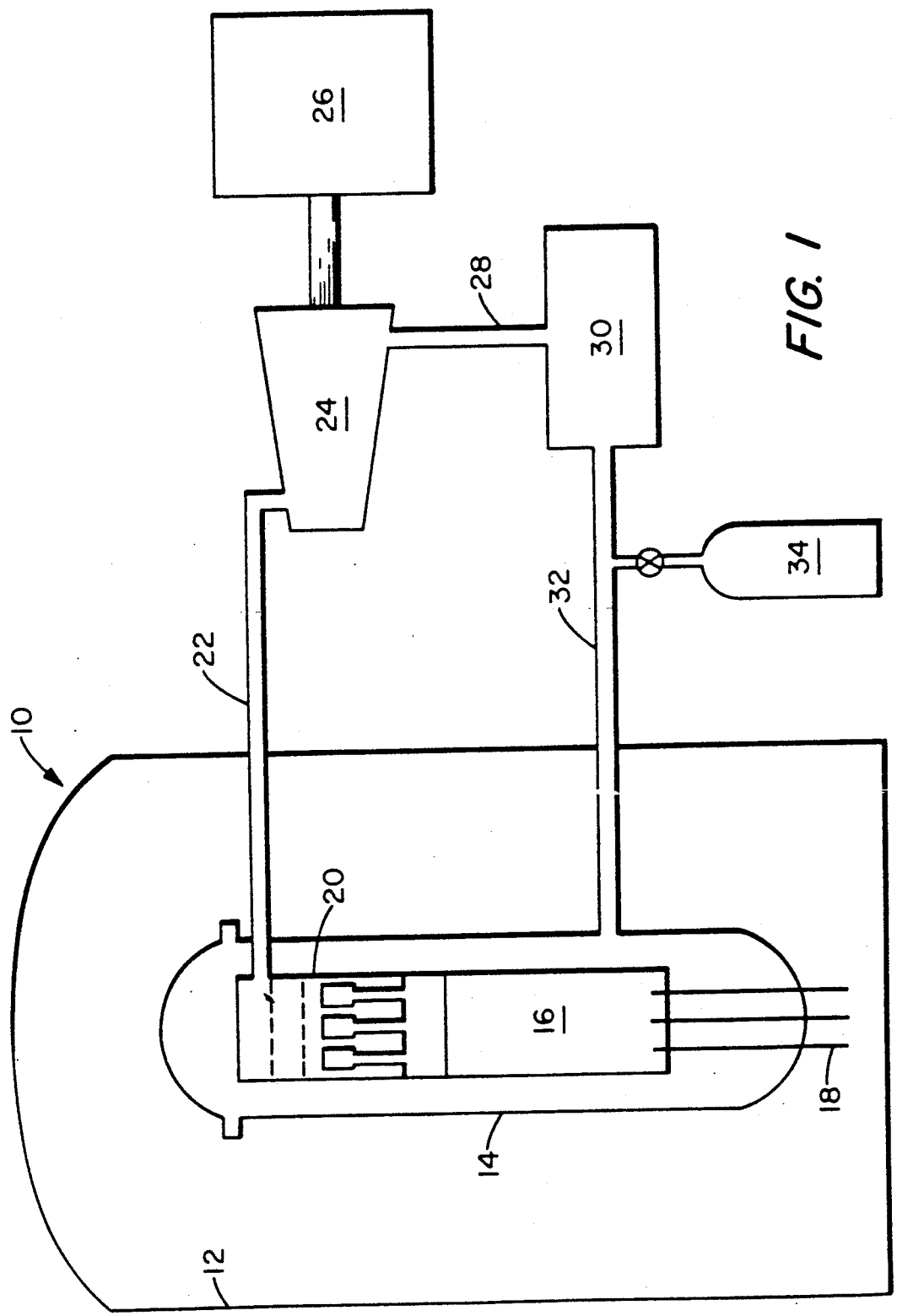
FIG. I

METHOD FOR ENHANCING PERSONNEL SAFETY IN OPERATING A NUCLEAR REACTOR PLANT, AND MEANS THEREFOR

FIELD OF THE INVENTION

This invention relates to water cooled, boiling water nuclear fission reactor plants for producing steam to be used in the generation of electrical power. The invention comprises measures for minimizing the amount of radiation attributable to a unique source and provides improved protection of operating and maintenance personnel performing within the electrical power generating facility.

BACKGROUND OF THE INVENTION

Corrosion is an inevitable problem in most water containing and operating systems such as steam producing boilers. This detrimental phenomenon is particularly destructive in steam generating nuclear fission reactors which present an environment of radiation as well as high temperatures accentuating the deleterious effects of the water upon many metal components.

Moreover, corrosion can constitute an exceedingly complex problem as to its source and effects upon structural materials, and the particular environment. One rather distinctive type of corrosion which has been found to occur in the stainless steel piping and other water containing vessels in nuclear reactor plants has been designated intergranular stress corrosion cracking. This type of corrosion is considered to be attributable to the stainless steel metal having become sensitized by high heat, such as from welding joints, and subsequently subjected to both mechanical stress and a corrosive environment, as well as the high temperatures and radiation encountered within and about a steam generating water cooled nuclear fission reactor plant.

The occurrence of such stress corrosion cracking has been found to be more prevalent or aggressive in higher oxidizing environments. High oxygen concentrations in nuclear fission reactor water coolant is a common condition due to the irradiation induced decomposition of some water into its components of oxygen and hydrogen. To counter the corrosive effects of a high oxidizing environment attributable to such radiation disassociation of water, it has been proposed to add hydrogen to reactor water coolant which will reduce free oxygen in the water by combining with it and thereby minimize its corrosive inducing effects. For example, under typical water chemistry conditions, the oxygen concentration is approximately 200 parts per billion and the hydrogen concentration is approximately 10 parts per billion. The concentration of oxygen and hydrogen found to be required for effective prevention of intergranular stress corrosion cracking is in the approximate range of about 2 to 15 parts per billion of oxygen and about 100 parts per billion hydrogen.

Corrosion control through manipulation of the free hydrogen and/or oxygen content of reactor water coolant is an established procedure.

Although an effective measure for controlling corrosion within the water system of a nuclear fission reactor, the addition of hydrogen to reactor water coolant for the purpose of suppressing the free oxygen content also fosters the conversion of nitrate and nitrite compounds within the water coolant to ammonia. This hydrogen promoted conversion of nitrogen containing compounds to volatile ammonia presents an ancillary problem within the radioactive environment of a nuclear fission reactor due to the radiation induced transmutation of oxygen, by the $O^{16}(n,p)$ reaction, into the nitrogen-16 isotope. Although nitrogen-16 is a radioactive nuclide with a half-life of only approximately 7 seconds, about 6 MeV gamma ray is emitted therefrom in its decay. The level of intensity and the relatively high energy of such gamma radiation would require significant shielding to protect personnel from the radiation field. Thus, when this gamma ray emitting nitrogen isotope derived from oxygen is incorporated in a compound which is then converted into volatile ammonia, it becomes a significant source of radiation which can be transported along with steam throughout a steam or vapor system.

Boiling water type of nuclear fission reactors, unlike pressure water reactors, produce steam initially within the reactor pressure vessel from the reactor coolant water surrounding at least a major portion of the heat producing core of fissionable nuclear fuel. This steam is conveyed directly from the fissioning fuel core containing reactor pressure vessel to its designated location of work such as a steam turbine for electrical power generation. Thus, differing from the pressure water type reactor where hot pressurized water from the reactor pressure vessel passes through a heat exchanger which in turn produces steam, the steam from a boiling water reactor passes directly to and through the turbine system and generating facility before returning by way of the circuit to the nuclear reactor pressure vessel for repeating the cycle.

Accordingly, when treating the coolant water in a boiling water nuclear fission reactor by the addition of hydrogen to control corrosion, there occurs a combination of conditions which may raise the radiation level in a nuclear plant facilities at locations beyond the reactor containment structure, namely, within the steam turbine electrical generating unit. For instance, it appears that an increase in hydrogen concentration of the coolant water will foster oxidation of nitrogen containing compounds in the coolant water to volatile ammonia, including those comprising radioactive nitrogen-16 isotope produced from oxygen. The ammonia, containing gamma ray emitting nitrogen isotopes, being readily volatile, will be carried along with the steam out from the reactor pressure vessel into and through steam conduits and the turbines of the generator, where it decays in the turbine condenser system.

Such a potentially adverse condition can significantly increase the reactors construction and operating costs because of a need for added radiation shielding and more stringent limitations on personnel exposure time in carrying out normal facilities operations and maintenance.

SUMMARY OF THE INVENTION

This invention comprises means for overcoming the transfer of volatile radioactive nitrogen compounds with steam to beyond the containment structure in the operation of a steam producing, water cooled, boiling water nuclear fission reactor plant. The invention provides for the conversion of volatile nitrogen compounds to non-volatile forms within the pressure vessel of the boiling water nuclear fission reactor.

OBJECTS OF THE INVENTION

It is a primary object of this invention to provide for enhanced personnel safety in the operations of a steam generating, water cooled, boiling water nuclear fission reactor.

It is also an object of this invention to provide means for inhibiting the transfer of radiation emitting compounds from a boiling water, nuclear fission reactor through the steam circuit beyond the reactor pressure vessel.

It is another object of this invention to provide a method for preventing the escape of volatile, radiation emitting compounds from a boiling water, nuclear fission reactor pressure vessel into the steam turbines of electrical power generators.

It is still another object of this invention to provide a method for converting volatile nitrogen compounds to non-volatile compounds within the pressure vessel of a water cooled, boiling water nuclear fission reactor.

It is also another object of this invention to provide a steam generating, water cooled, boiling water nuclear fission reactor system having means for converting volatile nitrogen compounds to non-volatile compounds.

It is a further object of this invention to provide a steam generating, water cooled, boiling water nuclear fission reactor having a steam separator and/or drying within the reactor pressure vessel which prevents the transfer with steam of radioactive nitrogen compounds from the pressure vessel.

BRIEF DESCRIPTION OF THE DRAWING

The drawing comprises a schematic diagram of a steam generating, water cooled, boiling water nuclear fission reactor plant.

DETAILED DESCRIPTION OF THE INVENTION

Referring to the drawing, a water cooled, boiling water nuclear fission reactor plant 10 for producing steam is shown combined with a steam powered turbine driving an electrical power generator.

The nuclear fission reactor plant 10, as is typical, comprises a containment structure 12 housing the nuclear reactor and isolating the radioactive material and radiation produced products from the outer environment as a safety precaution. Housed within the protective containment structure 12 is the reactor pressure vessel 14 containing a core 16 of fissionable fuel. Circulating coolant water surrounds at least a majority of the reactor fuel core 16. Control rods 18 regulate the neutron sustained fission reaction of the fissionable fuel of the core 16, and in turn the occurrence and level of heat producing fuel fission for forming steam from the circulating coolant water.

A steam separator and dryer system 20 is positioned above the fission heat emitting fuel 16 which produces steam from the surrounding coolant water, whereby the steam vapor rising from the fuel core is released from entrained liquid. Thus, the hot pressurized, steam discharged from the reactor pressure vessel is essentially free of ineffectual and corrosion causing liquid water, and thus suitable for turbine driving service.

The dry steam vapor from the reactor pressure vessel 14 is passed through steam conduit 22 to a steam turbine 24, producing rotary movement which is transferred to an electrical generator 26 for producing electrical power. The spent steam exhausted from the turbine 24, now reduced to low pressure, is passed to a steam condenser 30 where it is cooled and converted to liquid form from recycling back through a condensed coolant water return conduit 32 to the pressure vessel 14 for reuse. Thus the coolant water, in the form of liquid or of gaseous steam, continuously circulation through the coolant system, removing heat energy from the heat producing fuel for the formation of steam, which in turn drives the turbine 24, is condensed back to liquid form, and returned to repeat the cycle.

A practiced measure for inhibiting corrosion of certain types in nuclear reactor coolant water circulating systems such as described, consists of adding hydrogen to the recycling water as a means for reducing the free oxygen content, at least a portion of which is the result of radiation induced dissociation of some of the water. Accordingly, a hydrogen feed supply 34 can be provided to feed hydrogen into the coolant water system, such as into the condensed coolant water return conduit 32.

However, as noted above, there is a negative effort to increasing the hydrogen concentration of the reactor coolant water. Hydrogen apparently promotes the conversion of non-volatile nitrogen compounds present in the coolant water to volatile nitrogen compounds such as ammonia. As noted, this phenomenon coupled with the radiations induced transmutation of oxygen atoms to the gamma ray emitting nitrogen 16 isotope, results in volatile radioactive nitrogen compounds in the reactor coolant system. Such volatile radioactive nitrogen compounds, for example ammonia, entrained in the steam are carried beyond the reactor pressure vessel and the radiation retaining containment structure 12 and through the complete coolant circulating system. Thus, gamma ray emitting material passes through the turbine of power generating unit increasing the radiation level in the plant facility outside the enclosing protective containment 12. It has been observed, for example, that radiation levels within the steam system have been increased up to approximately five fold due to such circumstances.

In accordance with this invention, the conveyance of radiation emitting volatile material, such as ammonia comprising the nitrogen 16 isotope, out from the reactor pressure vessel and throughout the steam system including the steam turbine, thereby raising the radiation level outside the reactor containment and within the turbine/generator facility, is inhibited and controlled. Nitrogen containing compounds comprising any nitrogen 16 isotope, in more volatile forms such as ammonia, are oxidized to non-volatile, water soluble forms comprising nitrates ($NO_3$) and/or nitrites ($NO_2$) by catalytic oxidation within the reactor pressure vessel to preclude their escape with the emerging steam.

Oxidizing catalysts for use in the practice of this invention comprise metallic oxides having surfaces with oxidizing catalytic properties, such as oxides of group B metals of the periodic chart of elements, namely titanium dioxide and zirconium dioxide. Such catalytic oxidizing metals can be applied in the practice of this invention is a variety of arrangements for achieving the objective and advantages of chancing the safety of reactor plant operating and/or maintenance personnel performing outside of the protective reactor containment structure.

One embodiment for the practice of this invention comprises constructing at least a potion or the conventional steam separator and/or dryer units from titanium or zirconium metal and oxidizing apt portion of it surface to provide the means for catalytic oxidation of ammonia to nitrates and/or nitrites.

Another embodiment of this invention comprises surfacing at least a portion of the steam separator and/or dryer units, or other appropriate structure members within the reactor pressure vessel, with a suitable catalytic oxidizing metal such as titanium dioxide or zirconium dioxide. For example surfaces of conventional structural member can be plated by common means with titanium or zirconium metal, then oxidized on their exposed face.

Alternatively catalytic oxidizers can be provided by affixing added component of high surface area bodies such as titanium dioxide and/or zirconium dioxide, for example metal oxide sponge, in effective locations within the reactor pressure vessel, or external thereto for catalytic oxidation prior to the steam leaving the containment structures. Such added catalytic oxidizing components can be located at any position providing high surface contract with the evolving or flowing steam and any vapor entrained therewith.

According any apt arrangement will suffice whereby the produced steam and any entrained vapor are subjected to extensive contact with the surface of the catalytic oxidizing metal.

What is claimed is:

1. A method of enhancing personnel safety in the operation of a water cooled, steam producing, boiling water nuclear fission reactor wherein a portion of circulating coolant water is vaporized to steam by heat produced from fissioning fuel within a reactor pressure vessel and the produced steam with any entrained water and volatile components is passed through a steam separator and steam dryer device in route to power generating means, comprising the step of inhibiting the conveyance of volatile nitrogen compounds with the steam by catalytic oxidation of any volatile nitrogen components carried with the steam to non-volatile nitrogen compounds.

2. The method of enhancing personnel safety in the operation of a nuclear reactor of claim 1, wherein the catalytic oxidation of any volatile nitrogen compounds carried with the steam to non-volatile nitrogen compounds is effected by contacting the steam and an volatile nitrogen compounds with a metallic oxide catalyst.

3. The method of enhancing personnel safety in the operation of a nuclear reactor of claim 1, wherein the catalytic oxidation of any volatile nitrogen compounds carried with the steam to non-volatile nitrogen compounds is effected by contacting the steam and any volatile nitrogen compounds with at least one metallic oxide catalyst selected from the group consisting of titanium dioxide and zirconium dioxide.

4. The method of enhancing personnel safety in the operation of a nuclear reactor of claim 1, wherein the catalytic oxidation of any volatile nitrogen compounds carried with the steam to non-volatile nitrogen compounds is effected by contacting the steam and any volatile nitrogen compounds with a metallic oxide catalyst comprising titanium dioxide.

5. A method of enhancing personnel safety in the operation of a water cooled, steam producing, boiling water nuclear fission reactor wherein a position of circulating coolant water is vaporized to steam by heat produced from fissioning fuel within a reactor pressure vessel and the produced steam with any entrained water and volatile components from the coolant water is passed through a steam separator and steam dryer in route to a power generating means, comprising the steps of adding hydrogen to the circulating water coolant to repress corrosion and inhibiting the conveyance of volatile nitrogen compounds with the steam from the reactor pressure vessel by catalytic oxidation of any volatile nitrogen compounds carried with the steam to non-volatile nitrogen compounds.

6. The method of enhancing personnel safety in the operation of a nuclear reactor of claim 5, wherein the catalytic oxidation of any volatile nitrogen compounds carried with the steam to non-volatile nitrogen compounds is effected by contacting the steam and any volatile nitrogen compounds with a metallic oxide catalyst.

7. The method of enhancing personnel safety in the operation of a nuclear reactor of claim 5, wherein the catalytic oxidation of any volatile nitrogen compounds carried with the steam to non-volatile nitrogen compounds is effected by contacting the steam and any volatile nitrogen compounds with at least one metallic oxide catalyst selected from the group consisting of titanium dioxide and zirconium dioxide.

8. The method of enhancing personnel safety in the operation of a nuclear reactor of claim 5, wherein the catalytic oxidation of any volatile nitrogen compounds carried with the steam to non-volatile nitrogen compounds is effected by contacting the steam and any volatile nitrogen compounds with a metallic oxide catalyst comprising titanium dioxide.

9. A method of enhancing personnel safety in the operation of a water cooled, steam producing, boiling water nuclear fission reactor wherein a portion of circulating coolant water is vaporized to steam by heat produced from fissioning nuclear fuel within a reactor pressure vessel and the produced steam with any entrained liquid water and volatile components from the coolant water is passed through a steam separator and steam dryer within the reactor pressure vessel before discharge to a power generating means, comprising the steps of adding hydrogen to the circulating water coolant to repress corrosion and inhibiting the conveyance of volatile nitrogen compounds with the steam from the reactor pressure vessel by catalytic oxidation with titanium dioxide of any volatile nitrogen compounds carried with the steam to non-volatile nitrogen compounds.

10. A method of enhancing personnel safety in the operation of a water cooled, steam producing, boiling water nuclear fission reactor wherein a portion of circulating coolant water is vaporized to steam by heat produced from fissioning nuclear fuel within a reactor pressure vessel and the produced steam with any entrained liquid water and volatile components from the coolant water is passed through a steam separator and steam dryer within the reactor pressure vessel before discharge to a power generating means, comprising the steps of adding hydrogen to the circulating coolant water to repress corrosion within the circulating system and inhibiting the conveyance of volatile nitrogen compounds comprising ammonia with the steam from the reactor pressure vessel by catalytic oxidation with titanium dioxide of any volatile nitrogen compounds comprising ammonia carried with the steam to non-volatile nitrogen compounds comprising nitrates an nitrites.

* * * * *

UNITED STATES PATENT AND TRADEMARK OFFICE
CERTIFICATE OF CORRECTION

PATENT NO. : 5,028,384

DATED : July 2, 1991

INVENTOR(S) : John M. Skarpelos and Chien-Chang Lin

It is certified that error appears in the above-identified patent and that said Letters Patent is hereby corrected as shown below:

On the title page: Item [75] incorrect spelling for the Inventor "Chien-Chang Lin" should read -- Chien-Chang Lin.

Signed and Sealed this

Twenty-sixth Day of January, 1993

Attest:

STEPHEN G. KUNIN

*Attesting Officer*     *Acting Commissioner of Patents and Trademarks*